US011216559B1

(12) United States Patent
Gu et al.

(10) Patent No.: US 11,216,559 B1
(45) Date of Patent: Jan. 4, 2022

(54) SYSTEMS AND METHODS FOR AUTOMATICALLY RECOVERING FROM MALWARE ATTACKS

(71) Applicant: Symantec Corporation, Mountain View, CA (US)

(72) Inventors: Lei Gu, Bedford, MA (US); Ilya Sokolov, Boston, MA (US)

(73) Assignee: NortonLifeLock Inc., Tempe, AZ (US)

( * ) Notice: Subject to any disclaimer, the term of this patent is extended or adjusted under 35 U.S.C. 154(b) by 375 days.

(21) Appl. No.: 15/702,980

(22) Filed: Sep. 13, 2017

(51) Int. Cl.
*G06F 12/14* (2006.01)
*G06F 21/56* (2013.01)
*G06F 21/55* (2013.01)
*G06F 12/16* (2006.01)
*G06F 21/57* (2013.01)

(52) U.S. Cl.
CPC .......... *G06F 21/568* (2013.01); *G06F 21/554* (2013.01); *G06F 21/564* (2013.01); *G06F 21/565* (2013.01); *G06F 21/57* (2013.01)

(58) Field of Classification Search
CPC .... G06F 11/1448; G06F 21/56; G06F 21/563; G06F 21/566; G06F 21/568; G06F 3/0623; G06F 3/065; G06F 3/0673; G06F 21/554; G06F 21/564; G06F 21/565; G06F 21/57; H04L 63/1416; H04L 63/1425; H04L 63/20
USPC ............................... 713/175; 725/86; 726/24
See application file for complete search history.

(56) References Cited

U.S. PATENT DOCUMENTS

| 8,234,350 | B1 | 7/2012 | Gu et al. | |
|---|---|---|---|---|
| 8,843,750 | B1 | 9/2014 | Sokolov | |
| 8,918,387 | B1 | 12/2014 | Sokolov | |
| 9,317,686 | B1* | 4/2016 | Ye .................... | G06F 11/1448 |
| 9,514,309 | B1* | 12/2016 | Mann ................ | G06F 21/565 |
| 9,990,511 | B1* | 6/2018 | Dreyfus ............ | G06F 21/57 |
| 10,007,795 | B1* | 6/2018 | Chung .............. | G06F 21/62 |
| 10,032,033 | B2* | 7/2018 | Gu .................... | G06F 11/1446 |
| 10,210,330 | B1* | 2/2019 | Chen ................ | G06F 11/1451 |
| 2007/0220614 | A1* | 9/2007 | Ellis ................ | G06F 21/6245 726/27 |
| 2008/0027866 | A1* | 1/2008 | Halcrow .......... | G06F 21/6209 705/51 |
| 2012/0124007 | A1* | 5/2012 | Sten ................ | G06F 11/1448 707/685 |
| 2013/0067576 | A1* | 3/2013 | Niemela .......... | G06F 21/566 726/24 |
| 2015/0007315 | A1* | 1/2015 | Rivera ............ | G06F 21/566 726/23 |

(Continued)

*Primary Examiner* — Gary S Gracia
(74) *Attorney, Agent, or Firm* — FisherBroyles, LLP

(57) ABSTRACT

The disclosed computer-implemented methods for automatically recovering from malware attacks may include (1) saving, in response to determining that a reputation of a process is unknown, a backup copy of a file on a remote storage device prior to allowing the process to modify the file; (2) determining, after the process has modified the file, that the process is potentially malicious; and (3) restoring, in response to determining that the process is potentially malicious, the backup copy of the file from the remote storage device. The provided methods may automatically recover computers from ransomware attacks and other malware attacks which encrypt file systems. Various other methods, systems, and computer-readable media are also disclosed.

20 Claims, 5 Drawing Sheets

(56) References Cited

U.S. PATENT DOCUMENTS

| | | | |
|---|---|---|---|
| 2016/0180087 A1* | 6/2016 | Edwards | G06F 21/566 |
| | | | 726/24 |
| 2016/0371152 A1* | 12/2016 | Parshin | G06F 21/566 |
| 2016/0378988 A1* | 12/2016 | Bhashkar | G06F 21/568 |
| | | | 726/24 |
| 2017/0091453 A1* | 3/2017 | Cochin | G06F 21/64 |
| 2017/0140156 A1* | 5/2017 | Gu | G06F 21/566 |
| 2017/0177867 A1* | 6/2017 | Crofton | G06F 21/565 |
| 2017/0206353 A1* | 7/2017 | Jai | H04L 67/1097 |
| 2017/0223031 A1* | 8/2017 | Gu | H04L 63/1416 |
| 2018/0018458 A1* | 1/2018 | Schmugar | G06F 21/554 |
| 2018/0024893 A1* | 1/2018 | Sella | G06N 7/005 |
| | | | 707/648 |

\* cited by examiner

SYSTEMS AND METHODS FOR AUTOMATICALLY RECOVERING FROM MALWARE ATTACKS

BACKGROUND

Malware attacks are becoming increasingly sophisticated and aggressive. One type of malware is ransomware, also known as crypto-ransomware, which encrypts important files on a user's computing system and then holds the encrypted files for ransom. When the user does not pay the ransom, the important files remain encrypted, may be impossible to access, may be permanently lost, and/or may compromise functionality of the computing system. Recovery from this type of malware attack is critical, complicated, and often impossible without a decryption key. The instant disclosure, therefore, identifies and addresses a need for systems and methods for automatically recovering from malware attacks such as ransomware.

SUMMARY

As will be described in greater detail below, the instant disclosure describes various systems and methods for automatically recovering from malware attacks. In one example, a method for automatically recovering from malware attacks may include (1) identifying, at a computing device, an attempt by a process to modify at least one file; (2) determining that the process has an unknown reputation; (3) saving, in response to determining that the reputation of the process is unknown, a backup copy of the file on a remote storage device prior to allowing the process to modify the file; (4) determining, after the process has modified the file, that the process is potentially malicious; and (5) restoring, in response to determining that the process is potentially malicious, the backup copy of the file from the remote storage device.

In some embodiments, the method may include tagging the backup copy of the file with metadata that indicates that the backup copy of the file was created prior to allowing the process with the unknown reputation to modify the file; and selecting, based on the metadata, the backup copy of the file for restoring the computing device.

In some examples, the method may include identifying the reputation of the process from at least one of the backup copy of the file and a process-modified version of the file. In some embodiments, the method may include deleting, responsive to identifying the reputation of the process, a process-modified version of the file. In further examples, the restoring is automatic in response to determining that the process is potentially malicious. The method may also include prompting a user for permission to restore the backup copy of the file. Moreover, the method may include identifying, based on the reputation of the process, a potential security risk associated with the process; and performing, in response to identifying the potential security risk, a security action in an attempt to ameliorate the potential security risk.

In one embodiment, a system for automatically recovering from malware attacks may include several modules stored in memory, including (1) an identifying module that identifies an attempt by a process to modify at least one file; (2) a first determining module that determines that the process has an unknown reputation; (3) a saving module that saves, in response to determining that the reputation of the process is unknown, a backup copy of the file on a remote storage device prior to allowing the process to modify the file; (4) a second determining module that determines, after the process has modified the file, that the process is potentially malicious; (5) a restoring module that restores, in response to determining that the process is potentially malicious, the backup copy of the file from the remote storage device; and at least one physical processor that executes the identifying module, the first determining module, the saving module, the second determining module, and the restoring module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify, at the computing device, an attempt by a process to modify at least one file; (2) determine that the process has an unknown reputation; (3) save, in response to determining that the reputation of the process is unknown, a backup copy of the file on a remote storage device prior to allowing the process to modify the file; (4) determine, after the process has modified the file, that the process is potentially malicious; and (5) restore, in response to determining that the process is potentially malicious, the backup copy of the file from the remote storage device.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
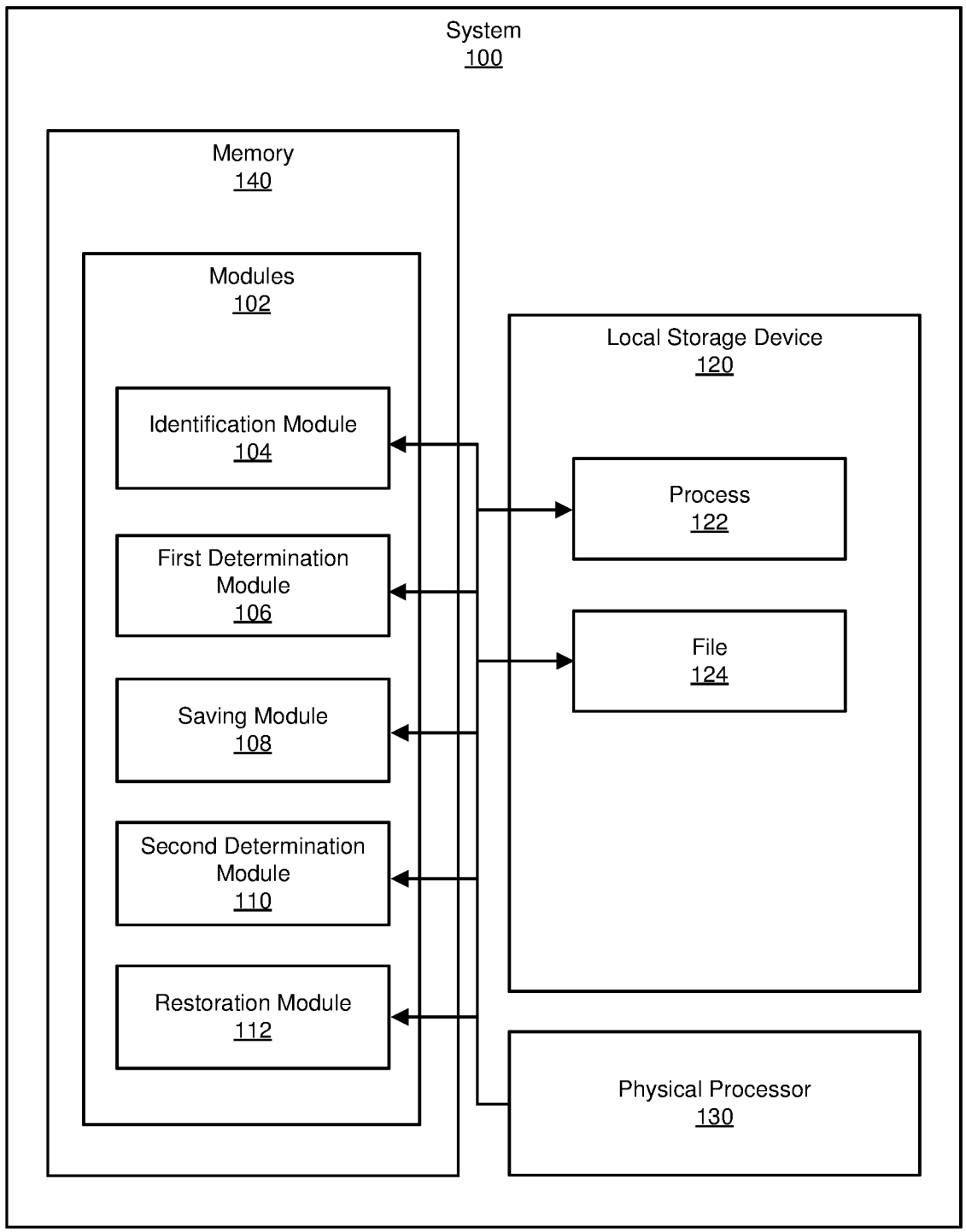
FIG. 1 is a block diagram of an example system for automatically recovering from malware attacks.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for automatically recovering and restoring computing devices to known-good states following malware attacks, such as ransomware attacks. As will be explained in greater detail below, in some examples the systems described herein may identify attempts by processes having unknown reputations to modify and/or delete files. In response, the files in question may be backed up in remote storage devices, such as cloud-based storage, prior to allowing the processes to delete and/or modify the files. If the reputations of the processes are later determined to be malicious, the processes may be automatically stopped, modifications made by the processes may be discarded, and the last-known good versions of the files may be restored from the remote storage devices.

By doing so, the systems and methods described herein may improve the functioning of a computing device, and thus the fields of malware protection in general, by providing a method for automatically recovering from and/or mitigating the effects of malware attacks. Thus, the disclosed systems and methods may provide asset protection for common targets of malware, such as hospitals, shipping companies, financial companies, governments, etc. by reducing recovery times needed to resume operations. In addition, the systems and methods described herein may render ransomware useless because an exact replica of an infected computer is available to recover the infected computer to a point immediately prior to data being encrypted by the ransomware—thus, no data is lost despite attacks.

Figure 2:
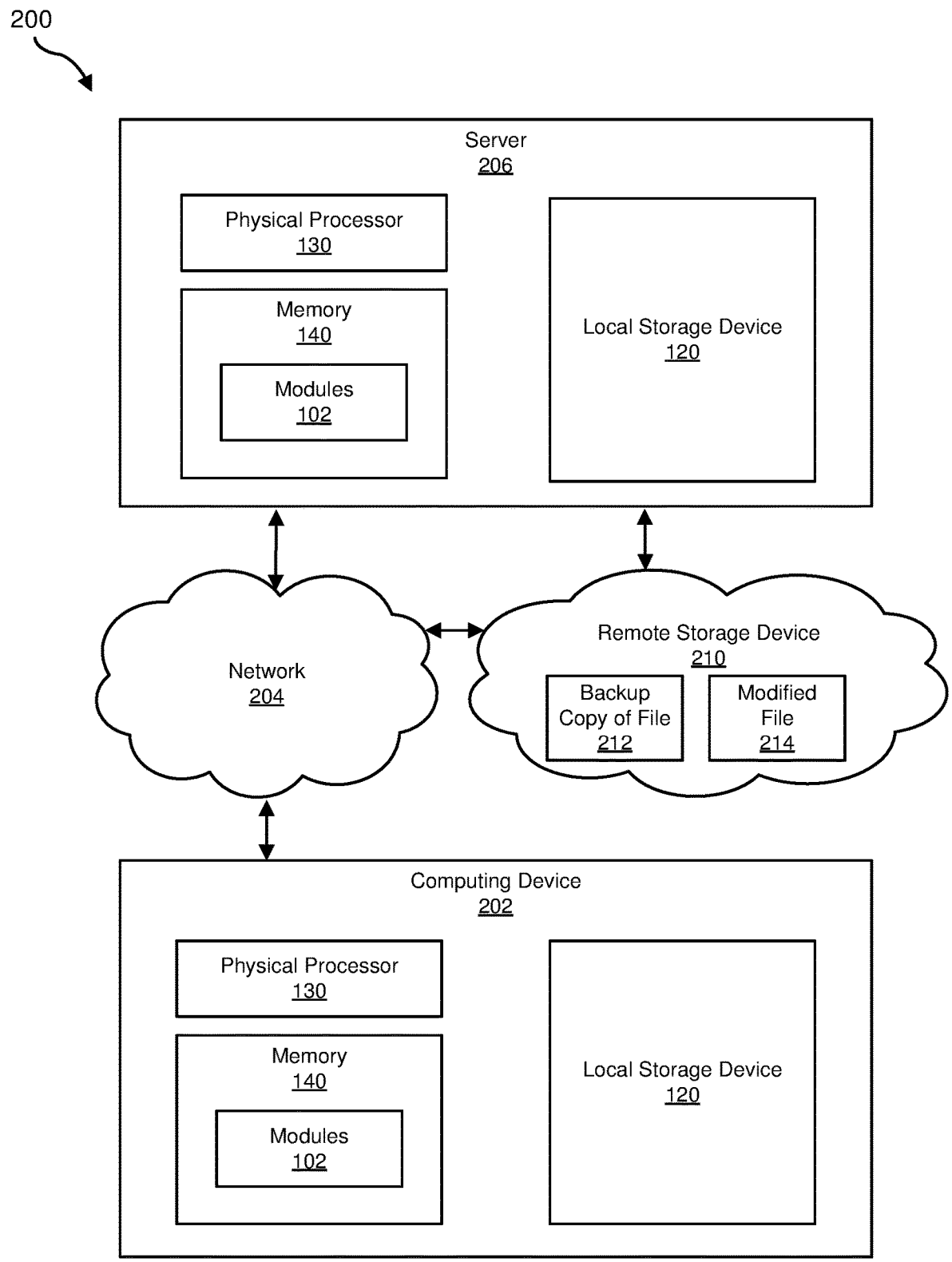
FIG. 2 is a block diagram of an additional example system for automatically recovering from malware attacks.

The following will provide, with reference to FIGS. 1 and 2, detailed descriptions of example systems for automatically recovering from malware attacks. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 4 and 5, respectively.

FIG. 1 is a block diagram of an example system 100 for automatically recovering from malware attacks. As illustrated in this figure, example system 100 may include one or more modules 102 for performing one or more tasks. As will be explained in greater detail below, modules 102 may include an identification module 104, a first determination module 106, a saving module 108, a second determination module 110, and a restoration module 112. Although illustrated as separate elements, one or more of modules 102 in FIG. 1 may represent portions of a single module or application.

In certain embodiments, one or more of modules 102 in FIG. 1 may represent one or more software applications or programs that, when executed by one or more computing devices, may cause the one or more computing devices to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate automatically recovering from malware attacks. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more local storage devices 120. Local storage device 120 generally represents any type or form of volatile or non-volatile storage device or medium capable of storing data and/or computer-readable instructions. In one example, local storage device 120 may store, load, and/or maintain one or more of processes 122 and/or files 124. Examples of local storage device 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204, as well as a remote storage device 210 in communication with network 204 and server 206. In one example, all or a portion of functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to automatically recover from malware attacks. For example, and as will be described in greater detail below, one or more of modules 102 may cause computing device 202 and/or server 206 to (1) identify, at computing device 202 and/or server 206, an attempt by process 122 to modify file 124; (2) determine that process 122 has an unknown reputation; (3) save, in response to determining that the reputation of process 122 is unknown, a backup copy 212 of file 124 on remote storage device 210 prior to allowing process 122 to modify file 124; (4) determine, after process 122 has modified file 124, that process 122 is potentially malicious; and (5) restore, in response to determining that process 122 is potentially malicious, backup copy 212 of file 124 from remote storage device 210.

Computing device 202 generally represents any type or form of computing device that reads computer-executable instructions. For example, computing device 202 may represent an endpoint device running client-side software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device that reads computer-executable instructions. For example, server 206 may represent an endpoint device running server-side software, such as a reputation server that services processes reputation lookup. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Remote storage device 210 generally represents any type or form of volatile or non-volatile storage device or medium capable of storing data and/or computer-readable instructions. In one example, remote storage device 210 may store, load, and/or maintain one or more backup copies 212 of file 124. Examples of remote storage device 210 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory. In some examples, remote storage device 210 may represent a server or cloud storage accessed via network 204.

Figure 3:
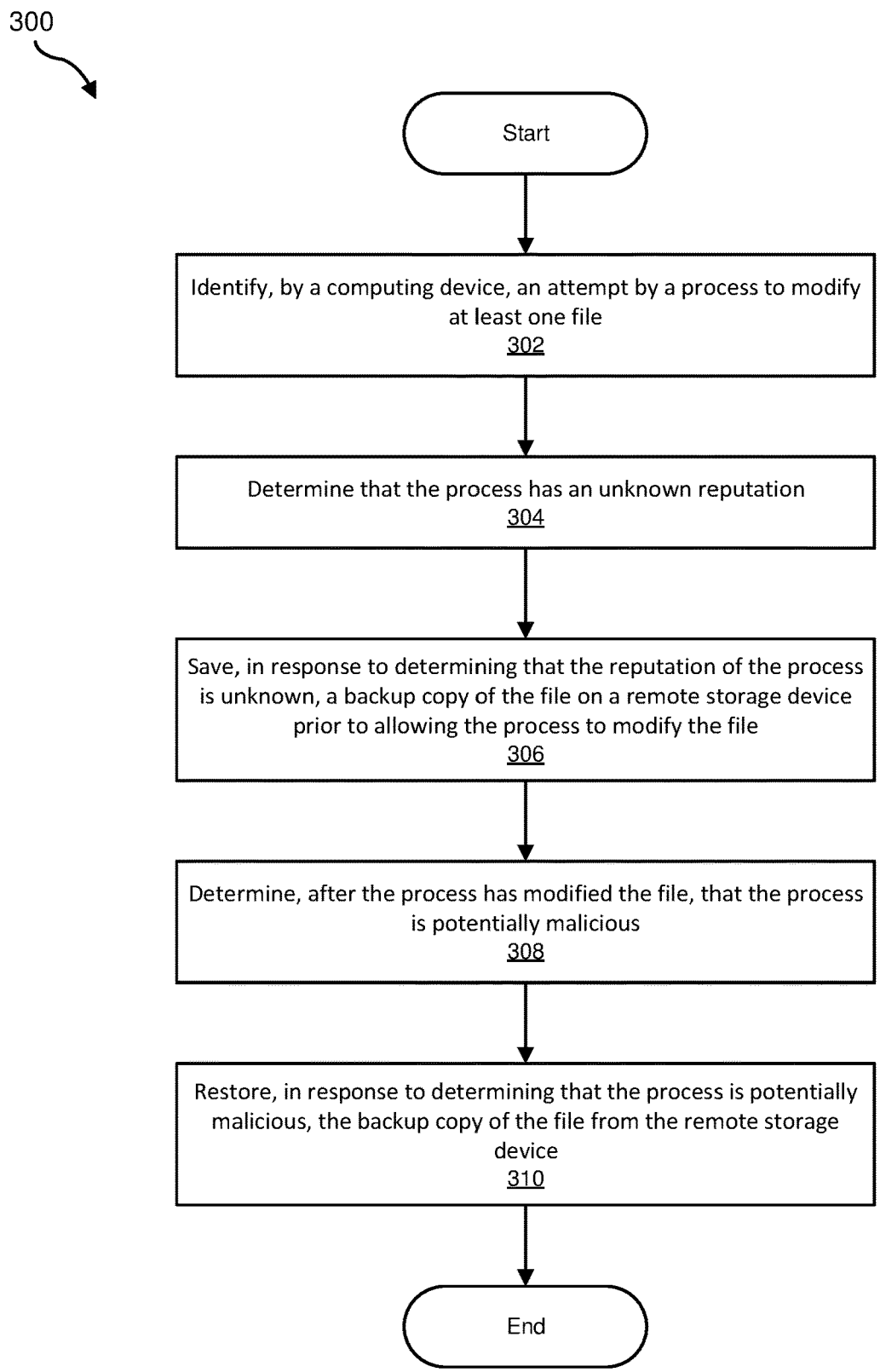
FIG. 3 is a flow diagram of an example method for automatically recovering from malware attacks.

FIG. 3 is a flow diagram of an example computer-implemented method 300 for automatically recovering from malware attacks. Steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure comprises and/or is represented by multiple sub-steps, examples of which will be provided in greater detail below.

As will be explained in greater detail below, one or more of the systems described herein may recover and restore computing devices to known-good states following malware attacks. For example, modules 102 may, as part of computing device 202 in FIG. 2, identify process 122 as having an unknown reputation and back up file 124 in remote storage device 210 as a backup copy 212 prior to allowing process 122 to delete and/or modify file 124. Subsequent to allowing process 122 to delete and/or modify file 124, if the reputation of process 122 is later determined to be malicious, then computing device 202 may terminate process 122 and restore file 124 with backup copy 212.

As illustrated in FIG. 3, at step 302 one or more of the systems described herein may identify, at a computing device, an attempt by a process to modify at least one file. For example, identification module 104 may, as part of system 100 in FIG. 1, computing device 202 in FIG. 2, and/or server 206 in FIG. 2, identify process 122 as attempting to modify and/or delete file 124.

Identification module 104 may detect attempts by processes to modify files in a variety of ways. In some embodiments, identification module 104 may monitor access to local storage device 120, memory 140, physical processor 130, and/or network 204. For example, identification module 104 may monitor files on local storage device 120 and/or memory 140. Identification module 104 may also monitor processes executed by physical processor 130.

Returning to FIG. 3, at step 304, one or more of systems described herein may determine that the process has an unknown reputation. For example, first determination module 106 may, as part of system 100 in FIG. 1, computing device 202 in FIG. 2, and/or server 206 in FIG. 2, identify process 122 as having an unknown reputation.

First determination module 106 may determine the reputation of a process in many different ways. For example, first determination module 106 may determine the reputation of an application or process using signature-based techniques (by, e.g., checking the application or process against a blacklist of known-malicious applications and/or a whitelist of trusted applications), using behavioral heuristics (by, e.g., comparing the behavior of an application or process with the behavior of known-malicious applications or process), determining whether the application or process has been digitally signed by a trusted authority, and/or using any other technique capable of determining whether an application or process is malicious or trusted.

The term "unknown reputation," as used herein, generally refers to any application, code, script, module, program, executable file, and/or library that has not been verified as trusted or untrusted. In some examples, an untrusted application may be a newly installed application that has not yet been analyzed by and/or has not been classified as safe by one or more security applications. In some examples, an application having an unknown reputation may be any application that is not on a whitelist of trusted applications. In addition, an application having an unknown reputation may include an application that has not been digitally signed by a trusted authority.

Returning to FIG. 3, at step 306, one or more of the systems described herein may save, in response to determining that the reputation of the process is unknown, a backup copy of the file targeted by the process on a remote storage device prior to allowing the process to modify and/or delete the file. Multiple backup copies may be made on different storage devices to provide redundancy. In some examples, one or more of the systems described herein may save only important files. For example, saving module 108 may, as part of system 100 in FIG. 1, computing device 202 in FIG. 2, and/or server 206 in FIG. 2, save file 124 as backup copy 212 on remote storage device 210. After saving module 108 saves file 124, process 122 may be allowed to modify and/or delete file 124.

Saving module 108 may save file 124 as backup copy 212 on remote storage device 210 in many different ways. In some embodiments, saving module 108 may be located on computing device 202 and may store file 124 on remote storage device 210 via network 204 and/or server 206. In other embodiments, saving module 108 may be located on server 206, retrieve file 124 from computing device 202, and store file 124 on remote storage device 210 via network 204. In additional examples, saving module 108 may be located on server 206, retrieve file 124 from computing device 202, and directly store file 124 on remote storage device 210. In other embodiments, saving module 108 and file 124 may be located on server 206, and saving module 108 may store file 124 on remote storage device 210 via network 204. In additional examples, saving module 108 and file 124 may be located on server 206, and saving module 108 may directly store file 124 on remote storage device 210.

In some examples, backup copies of files may be tagged with metadata. This metadata may indicate that the backup copies were created prior to allowing processes with unknown reputations to modify and/or delete the files. In some examples, this metadata may indicate specific processes attempting to modify and/or delete the files. For example, saving module 108 may, as part of system 100 in FIG. 1, computing device 202 in FIG. 2, and/or server 206 in FIG. 2, tag file 124 with metadata indicating that backup copy 212 was created prior to allowing process 122 to modify file 124. This metadata may include a variety of data, including a file description, date of saving, time of saving, etc.

In some examples, modified files 214 created by process 122 may be stored in remote storage device 210. Examples of modified files 214 created by process 122 include backups, revisions, etc. In some examples, modified files 214 may be tagged with metadata that indicates the process (e.g., process 122) that modified them. This metadata may include a variety of data, such as a file description, date of saving, time of saving, etc.

In some examples, modified files 214 may be analyzed to assist in determining the reputation of the process. For example, saving module 108 may, as part of system 100 in FIG. 1, computing device 202 in FIG. 2, and/or server 206 in FIG. 2, save modified files 214 in remote storage device 210 after allowing process 122 to modify file 124. If a malware attack is not detected during a safe period, then revisions created by process 122 may be merged into the original revision of file 124, backup copy 212 may be deleted from remote storage device 210, and process 122 may be marked as having a good reputation. In one example, this safe period may be approximately seven days, as a longer period may raise storage costs, and a shorter period may not provide enough time to determine the reputation of process 122. Safe periods may also have other durations, as is practicable. Safe period durations may be determined by various methods, such as by using a default time period, by observing the lengths of ransomware attacks, and by the relative importance of files affected by the process.

Returning to FIG. 3, at step 308, one or more of the systems described herein may determine, after the process has modified the file, that the process is potentially malicious. For example, second determination module 110 may, as part of system 100 in FIG. 1, computing device 202 in FIG. 2, and/or server 206 in FIG. 2, identify process 122 as having a known reputation as potentially malicious. When process 122 is determined to be malicious during the safe period, second determination module 110 may kill process 122, remove executable files associated with process 122 from local storage device 120, and/or delete modified files 214 created by process 122.

Second determination module 110 may determine the potentially malicious reputation of process 122 in many different ways. In some embodiments, second determination module 110 may query a reputation server, such as server 206 in FIG. 2, about the reputation of process 122. Second determination module 110 and/or reputation server may also check the process 122 against a whitelist of trusted applications and/or a blacklist of known-malicious applications. Second determination module 110 may also use behavioral heuristics (by, e.g., comparing the behavior of an application or process with the behavior of known-malicious applications or process) to determine the reputation of process 122. In addition, second determination module 110 and/or reputation server may determine whether process 122 has been digitally signed by a trusted authority.

In some examples, the step of determining the reputation of the process may occur after a defined period of time. In some embodiments, second determination module 110 may query a reputation server, such as server 206 in FIG. 2, about the reputation of process 122.

In some examples, the reputation of the process may be determined from the backup copy of the file and/or a process-modified version of the file. For example, second determination module 110 may analyze backup copy 212 and modified files 214 to identify the effects of process 122 on file 124, and query a reputation server, such as server 206 in FIG. 2, about the effects of process 122 on file 124 in order to identify the reputation of process 122.

In some examples, a potential security risk associated with the process may be identified, based on the reputation of the process, and, in response to identifying the potential security risk, a security action may be performed in an attempt to ameliorate the potential security risk. For example, second determination module 110 may identify a potential security risk associated with process 122 and, in response, perform a security action in an attempt to ameliorate the potential security risk. The security action may include stopping process 122 and then triggering restoration module 112 to restore file 124 with backup copy 212. The security action may also include notifying server 206 that the potential security risk is associated with process 122 and/or file 124.

Returning to FIG. 3, at step 310, one or more of the systems described herein may restore, in response to determining that the process has a reputation of malicious or potentially malicious, the backup copy of the file from the remote storage device to roll-back the computer system to a known-good state for all files impacted by the process. For example, restoration module 112 may, as part of system 100 in FIG. 1, computing device 202 in FIG. 2, and/or server 206 in FIG. 2, retrieve backup copy 212 on remote storage device 210 and restore file 124 from backup copy 212. After restoration module 112 saves backup copy 212 as file 124, restoration module 112 may delete backup copy 212 from remote storage device 210.

In some examples, the backup copy of the file may be tagged with metadata. As detailed above, this metadata may indicate that the backup copy of the file was created prior to allowing the process with the unknown reputation to modify the file. Restoration module 112 may then, as part of system 100 in FIG. 1, computing device 202 in FIG. 2, and/or server 206 in FIG. 2, use the metadata to select backup copy 212 as having been created prior to allowing process 122 to modify file 124. This metadata may include data such as a file description, date of saving, time of saving, etc.

In some examples, the restoring operation may be automatically performed in response to determining that the process is potentially malicious. For example, restoration module 112 may, as part of system 100 in FIG. 1, computing device 202 in FIG. 2, and/or server 206 in FIG. 2, retrieve backup copy 212 on remote storage device 210 and restore file 124 from backup copy 212 without instructions from a user to do so. In some examples, restoration module 112 may only automatically restore files impacted by process 122 when there is a high certainty that process 122 is malicious.

In other embodiments, the restoring operation may not be performed automatically, and a user may be prompted for permission to restore backup copy 212. For example, restoration module 112 may, as part of system 100 in FIG. 1, computing device 202 in FIG. 2, and/or server 206 in FIG. 2, prompt a user for permission to retrieve backup copy 212 on remote storage device 210 and restore file 124 from backup copy 212. In some examples, restoration module 112 may only prompt a user for permission to restore backup copy 212 when there is a high certainty process 122 is malicious.

As detailed above, the steps outlined in method 300 in FIG. 3 may enable computing devices to be automatically recovered and restored to known-good states following malware attacks, such as ransomware attacks. For example, prior to allowing a process to modify a file, the systems described herein may identify back up the file in question to a remote storage device. If the reputation of the process is later determined to be malicious, the process may be automatically stopped, modifications made by the process may be discarded, and the last known-good version of the file may be restored from the remote storage device. By doing so, the systems and methods described herein may improve the state of security of the computing device in question, potentially resulting in significant time and/or monetary savings.

Figure 4:
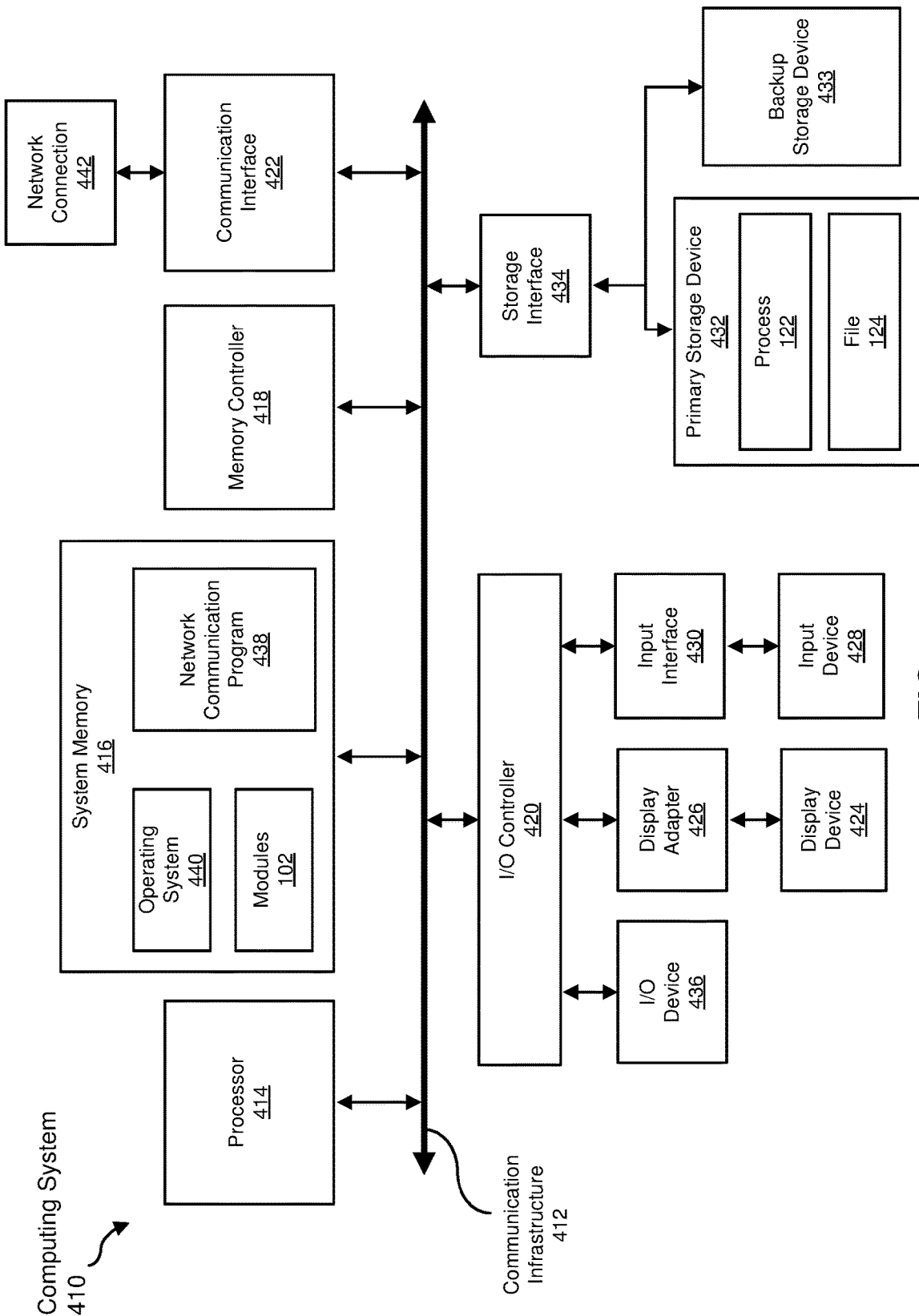
FIG. 4 is a block diagram of an example computing system capable of implementing one or more of the embodiments described and/or illustrated herein.

FIG. 4 is a block diagram of an example computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the example embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In some examples, system memory 416 may store and/or load an operating system 440 for execution by processor 414. In one example, operating system 440 may include and/or represent software that manages computer hardware and software resources and/or provides common services to computer programs and/or applications on computing system 410. Examples of operating system 440 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

As illustrated in FIG. 4, computing system 410 may also include at least one display device 424 coupled to I/O controller 420 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, example computing system 410 may also include at least one input device 428 coupled to I/O controller 420 via an input interface 430. Input device 428 generally represents any type or form of input device capable of providing input, either computer or human generated, to example computing system 410. Examples of input device 428 include, without limitation, a keyboard, a pointing device, a speech recognition device, variations or combinations of one or more of the same, and/or any other input device.

Additionally or alternatively, example computing system 410 may include additional I/O devices. For example, example computing system 410 may include I/O device 436. In this example, I/O device 436 may include and/or represent a user interface that facilitates human interaction with computing system 410. Examples of I/O device 436 include, without limitation, a computer mouse, a keyboard, a monitor, a printer, a modem, a camera, a scanner, a microphone, a touchscreen device, variations or combinations of one or more of the same, and/or any other I/O device.

Communication interface 422 broadly represents any type or form of communication device or adapter capable of facilitating communication between example computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

In some examples, system memory 416 may store and/or load a network communication program 438 for execution by processor 414. In one example, network communication program 438 may include and/or represent software that enables computing system 410 to establish a network connection 442 with another computing system (not illustrated in FIG. 4) and/or communicate with the other computing system by way of communication interface 422. In this example, network communication program 438 may direct the flow of outgoing traffic that is sent to the other computing system via network connection 442. Additionally or alternatively, network communication program 438 may direct the processing of incoming traffic that is received from the other computing system via network connection 442 in connection with processor 414.

Although not illustrated in this way in FIG. 4, network communication program 438 may alternatively be stored and/or loaded in communication interface 422. For example, network communication program 438 may include and/or represent at least a portion of software and/or firmware that is executed by a processor and/or Application Specific Integrated Circuit (ASIC) incorporated in communication interface 422.

As illustrated in FIG. 4, example computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, process 122 and/or file 124 from FIG. 1 may be stored and/or loaded in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. The storage device 632 may store the process 122 and/or the file 124. When executed by processor 414, a computer program loaded into computing system 410 may cause processor 414 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 410 may be configured as an Application Specific Integrated Circuit (ASIC) adapted to implement one or more of the example embodiments disclosed herein.

Figure 5:
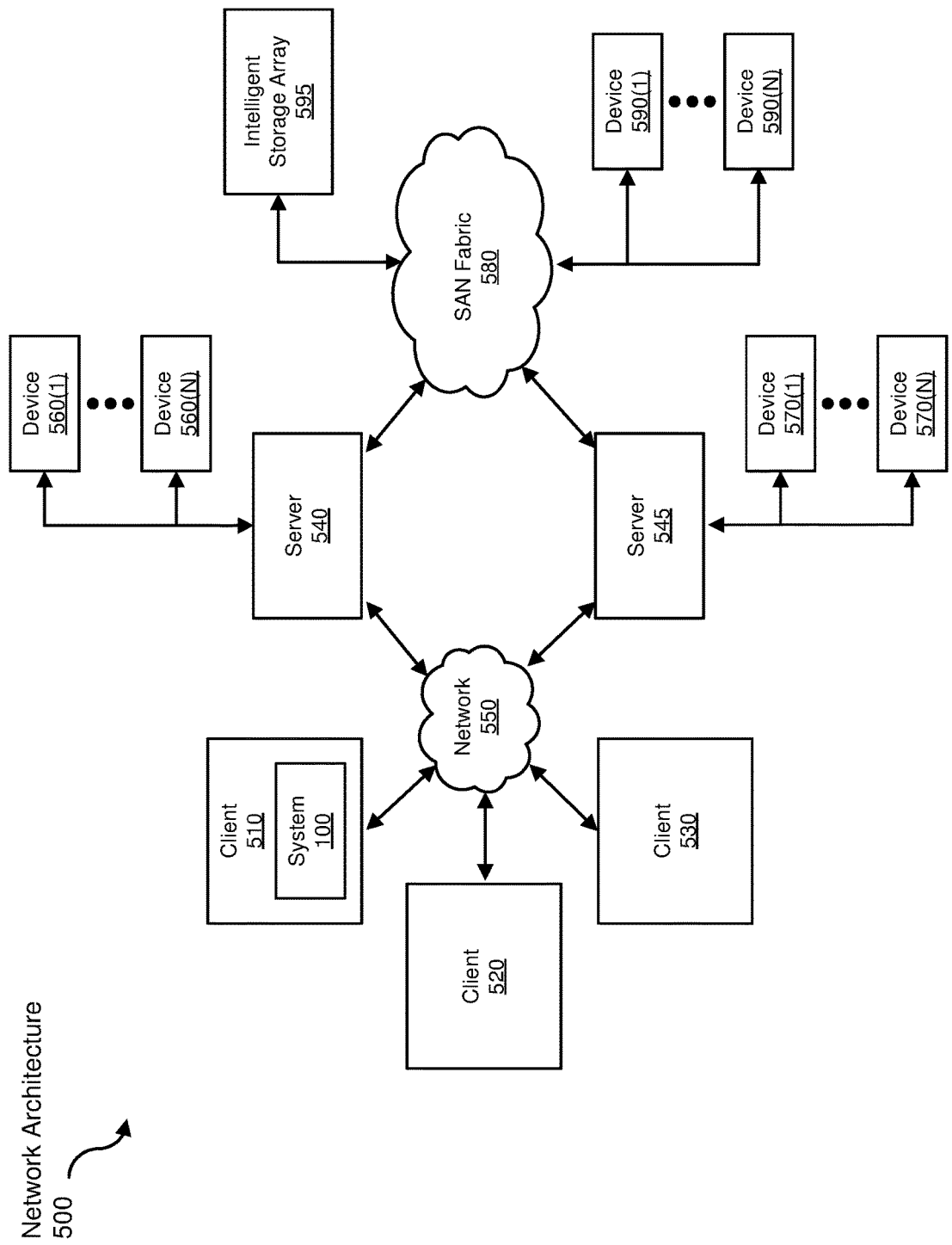
FIG. 5 is a block diagram of an example computing network capable of implementing one or more of the embodiments described and/or illustrated herein.

FIG. 5 is a block diagram of an example network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as example computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to example computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the example embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an example method for automatically recovering from malware attacks.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures may be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and may be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may, such as during restoring of a backup copy of a file from a remote storage device, receive data to be transformed, transform the data, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for automatically recovering from malware attacks, at least a portion of the method being performed by a computing device comprising at least one processor, the method comprising:
   identifying, at the computing device, an attempt by a process to modify a file;
   determining that the process has an unknown reputation;
   saving, in response to determining that the reputation of the process is unknown, a backup copy of the file on a remote storage device prior to allowing the process to modify the file;
   determining, after the process has modified the file, after a defined period of time following saving the backup copy of the file, and from the backup copy of the file, that the process is potentially malicious, wherein the defined period of time is based on observed lengths of ransomware attacks; and
   restoring, in response to determining that the process is potentially malicious, the backup copy of the file from the remote storage device.

2. The method of claim 1, further comprising:
   tagging the backup copy of the file with metadata that indicates that the backup copy of the file was created prior to allowing the process with the unknown reputation to modify the file; and
   selecting, based on the metadata, the backup copy of the file for restoring the computing device.

3. The method of claim 1, further comprising marking, when a malware attack is not detected during a safe period, the process as having a good reputation.

4. The method of claim 1, further comprising determining the process is potentially malicious from a process-modified version of the file.

5. The method of claim 1, further comprising deleting, responsive to identifying the reputation of the process, a process-modified version of the file.

6. The method of claim 1, wherein the restoring is automatic in response to determining that the process is potentially malicious.

7. The method of claim 1, further comprising prompting a user for permission to restore the backup copy of the file.

8. The method of claim 1, further comprising:
   identifying, based on the reputation of the process, a potential security risk associated with the process; and
   performing, in response to identifying the potential security risk, a security action in an attempt to ameliorate the potential security risk.

9. A system for automatically recovering from malware attacks, the system comprising:
   a memory device;
   an identifying module, stored in the memory device, that identifies an attempt by a process to modify a file;
   a first determining module, stored in the memory device, that determines that the process has an unknown reputation;
   a saving module, stored in the memory device, that saves, in response to determining that the reputation of the process is unknown, a backup copy of the file on a remote storage device prior to allowing the process to modify the file;
   a second determining module, stored in the memory device, that determines, after the process has modified the file, after a defined period of time following saving the backup copy of the file, and from the backup copy of the file, that the process is potentially malicious, wherein the defined period of time is based on observed lengths of ransomware attacks;
   a restoring module, stored in the memory device, that restores, in response to determining that the process is potentially malicious, the backup copy of the file from the remote storage device; and
   at least one physical processor that executes the identifying module, the first determining module, the saving module, the second determining module, and the restoring module.

10. The system of claim 9, further comprising:
    a tagging module, stored in the memory device, that tags the backup copy of the file with metadata that indicates that the backup copy of the file was created prior to allowing the process with the unknown reputation to modify the file; and
    a selecting module, stored in the memory device, that selects, based on the metadata, the backup copy of the file for restoring the system.

11. The system of claim 9, wherein the second determining module marks, when a malware attack is not detected during a safe period, the process as having a good reputation.

12. The system of claim 9, wherein the second determining module determines the process is potentially malicious from a process-modified version of the file.

13. The system of claim 9, further comprising a deleting module, stored in the memory device, that deletes, responsive to identifying the reputation of the process, a process-modified version of the file.

14. The system of claim 9, wherein the restoring module automatically restores the backup copy of the file from the remote storage device in response to determining that the process is potentially malicious.

15. The system of claim 9, further comprising a prompting module, stored in the memory device, that prompts a user for permission to restore the backup copy of the file.

16. The system of claim 9, further comprising:
    a second identifying module, stored in the memory device, that identifies, based on the reputation of the process, a potential security risk associated with the process; and
    a performing module, stored in the memory device, that performs, in response to identifying the potential security risk, a security action in an attempt to ameliorate the potential security risk.

17. A non-transitory computer-readable medium comprising one or more computer-executable instructions that, when executed by at least one processor of a computing device, cause the computing device to:
    identify, at the computing device, an attempt by a process to modify a file;
    determine that the process has an unknown reputation;
    save, in response to determining that the reputation of the process is unknown, a backup copy of the file on a remote storage device prior to allowing the process to modify the file;
    determine, after the process has modified the file, after a defined period of time following saving the backup copy of the file, and from the backup copy of the file, that the process is potentially malicious, wherein the defined period of time is based on observed lengths of ransomware attacks; and
    restore, in response to determining that the process is potentially malicious, the backup copy of the file from the remote storage device.

18. The non-transitory computer-readable medium of claim 17, further comprising one or more computer-executable instructions that, when executed by the at least one processor of the computing device, cause the computing device to mark, when a malware attack is not detected during a safe period, the process as having a good reputation.

19. The non-transitory computer-readable medium of claim 17, wherein the computer-executable instructions that cause the computing device to restore the backup copy of the file from the remote storage device comprise computer-executable instructions to cause the computing device to automatically restore the backup copy of the file from the remote storage device in response to determining that the process is potentially malicious.

20. The non-transitory computer-readable medium of claim 17, further comprising one or more computer-executable instructions that, when executed by the at least one processor of the computing device, cause the computing device to delete, responsive to identifying the reputation of the process, a process-modified version of the file.

* * * * *